(12) United States Patent
Yoshida

(10) Patent No.: US 6,332,682 B1
(45) Date of Patent: Dec. 25, 2001

(54) HINGE STRUCTURE FOR USE IN JOINING TEMPLE AND FRONT RIM IN EYEGLASSES

(75) Inventor: Toshihiro Yoshida, Fukui-ken (JP)

(73) Assignee: Yoshida Industry Co., Ltd., Fukui-ken (JP)

( * ) Notice: Subject to any disclaimer, the term of this patent is extended or adjusted under 35 U.S.C. 154(b) by 0 days.

(21) Appl. No.: 09/769,246

(22) Filed: Jan. 26, 2001

(30) Foreign Application Priority Data

Sep. 29, 2000 (JP) .................................................. 12-297903

(51) Int. Cl.[7] ....................................................... G02C 5/22
(52) U.S. Cl. ........................... 351/153; 351/121; 351/141; 16/228
(58) Field of Search ................................... 351/153, 121, 351/140, 141; 16/228

(56) References Cited

U.S. PATENT DOCUMENTS 3,025,762 * 3/1962 Vigano ................................. 351/153
3,609,018 * 9/1971 Marolla ................................. 351/95
5,011,274 * 4/1991 Wagner ................................ 351/121
5,764,337 * 6/1998 Petignat ............................... 351/153

* cited by examiner

Primary Examiner—Huy Mai
(74) Attorney, Agent, or Firm—Rader, Fishman, Grauer, PLLC

(57) ABSTRACT

Disclosed is an improved hinge structure for joining a temple and a front or lens rim together in eyeglasses. It comprises two semicolon-like rotary pieces each having a step-like circular extension integrally connected to its triangular block. The step-like circular extension has a through hole made therein. The semicolon-like rotary pieces are so combined that their step-like circular extensions are laid on each other, with a flat washer sandwiched therebetween. The semicolon-like rotary pieces are joined together by inserting a pivot pin in the through holes of the step-like extensions with another flat washer laid on one side of the so combined rotary pieces, and with the outward-curved resilient washer laid the other side of the so combined rotary pieces. The pivot pin is swaged against the so combined rotary pieces. The triangular blocks of the rotary pieces are to be fixed to the temple and the front or lens rim of the frame.

4 Claims, 5 Drawing Sheets

HINGE STRUCTURE FOR USE IN JOINING TEMPLE AND FRONT RIM IN EYEGLASSES

BACKGROUND OF THE INVENTION

1. Field of the Invention

The present invention relates to a hinge structure for use in joining a temple and a front rim in eyeglasses, particularly for use in an attractively slim front-and-temple combination.

2. Related Arts

Referring to FIGS. 5a and 5b, a conventional hinge structure for eyeglasses has two semicolon-like rotary metal pieces "a" and "b" interleaved and rotatably joined together by a pivot screw "c". One of the semicolon-like rotary metal pieces "a" has parallel circular extensions "k" integrally connected to its triangular block, leaving a circular space therebetween. The other semicolon-like rotary metal piece "b" has a cantilever-like circular extension "i" integrally connected to its triangular block, and the cantilever-like circular extension "i" can be fitted in the circular space of the semicolon-like rotary metal piece "a". Each circular extension has a through hole made therein.

One of rotary metal pieces can be soldered at its flat bottom "d" to the side joint piece (not shown) of the front whereas the other rotary metal piece can be soldered to the temple (not shown). Thus, the temple can be folded toward the front of the frame.

After being used for a long period such hinge structure is apt to get loosened because of frictional wear in the confronting surfaces of the rotary metal pieces. Also, the pivot screw is apt to be loosened, and accordingly the hinge is loosened. In any event the eyeglasses are not stable on one's face. When loosened, the pivot screw must be tightened. In the hope of preventing the frictional wear of the confronting surfaces of the rotary metal pieces "a" and "b" washers "e" are used, as seen from FIG. 6.

Referring to FIGS. 7a and 7b, the washer "e" comprises an eyelet disk "f" having an annular collar "g" integrally connected thereto. A screw "c" can be inserted in the center hole "h" of the washer "e". Referring to FIG. 6, washers "e" are laid between the confronting surfaces of the interleaved circular extensions "i" and "k" of the rotary metal pieces "a" and "b". Specifically the annular collar "g" of rotary metal piece "i" with its eyelet disk "f" sandwiched between the confronting surfaces of the interleaved circular extensions "i" and "k" of the joined rotary metal pieces "a" and "b", thus preventing the confronting surfaces from being worn.

As seen from FIG. 6, the cantilever-like circular extension "i" of the semicolon-like rotary metal piece is inserted in the circular space between the parallel circular extensions "k" of the counter semicolon-like rotary metal piece. This interdigitation prevents flat washers from being held between the confronting surfaces of the circular extensions of the opposite rotary metal pieces, requiring use of collared washers such as shown in FIGS. 7a and 7b. Use of such collared washers necessitates the enlarging of the through hole "j" of each circular extension, and accordingly the circular extension need to be increased in diameter because otherwise, the rotary piece cannot have a required strength.

As a recent tendency a very thin wire is used in making the frame of eyeglasses. The conventional hinge structure of FIGS. 5a and 5b, if used in joining the temple to the front rim, would appear above the thin wire temple on its upper and lower sides because the height H of the hinge structure is higher than the vertical size of the thin wire. The conventional hinge structure has an increasing width because of use of collared washers, and therefore, it projects outward from the temple-to-front joint unpleasantly. As a result the appearance of eyeglasses is less attractive.

Also disadvantageously, the number of manufacturing steps required in producing collared washers is larger than that in producing flat washers. In hinging the temple to the front rim of the frame, first, two small-sized collared washers are fitted in the through hole of the cantilever-like circular extension of one rotary piece, and then, the cantilever-like circular extension having the collared washers fitted in its through hole is inserted in the circular space between the parallel circular extensions of the other rotary part. These require time-consuming, tedious work.

One object of the present invention is to provide a hinge structure which is so small that it may fit the attractive slim frame of eyeglasses well, and can be easily assembled.

SUMMARY OF THE INVENTION

A hinge structure for joining a temple and a front or lens rim together in eyeglasses is improved according to the present invention in that it comprises: two semicolon-like rotary pieces each having a step-like circular extension integrally connected to its triangular block, the step-like circular extension having a through hole made therein; a pivot pin; two flat washers and an outward-curved resilient washer, the semicolon-like rotary pieces being so combined that their step-like circular extensions are laid on each other, with one of the flat washers sandwiched therebetween, and the semicolon-like rotary pieces being joined together by inserting the pivot pin in the through holes of the step-like extensions with the other flat washer laid on one side of the so combined rotary pieces, and with the outward-curved resilient washer laid on the other side of the so combined rotary pieces, the pivot pin being swaged against the so combined rotary pieces, the triangular blocks of the rotary pieces being to be fixed to the temple and the front or lens rim of the frame.

The pivot pin may be a headed pin whose shank has male threads formed on its end length, and the step-like extension of one of the two rotary pieces may have female threads formed in its through hole, thereby permitting the male-threaded end of the pivot pin to be meshed with the female threads of the through hole of the step-like extension.

The outward-curved resilient washer may have a number of radial bulges formed on its annular surface.

A hinge structure for joining a temple and a front or lens rim together in eyeglasses is improved according to the present invention in that it comprises: two semicolon-like rotary pieces each having a step-like circular extension integrally connected to its triangular block, each step-like circular extension having a through hole made therein, the through hole of the step-like extension of one of the semicolon-like rotary pieces having female threads formed therein; a headed pivot pin whose shank has male threads formed on its end length; and two flat washers, the semicolon-like rotary pieces being so combined that their step-like circular extensions are laid on each other, with one of the flat washers sandwiched therebetween, and with the other flat washer sandwiched between the head of the headed pivot pin and the counter surface of the step-like extension of the other semicolon-like rotary piece, the semicolon-like rotary pieces being joined together by inserting the pivot pin in the through holes of the step-like extensions and by swaging the end of the headed pivot pin against the counter surface of the step-like extension of the one semicolon-like rotary piece, the triangular blocks of the rotary pieces being to be fixed to the temple and the front or lens rim of the frame.

Other objects and advantages of the present invention will be understood from the following description of hinge structures according to some preferred embodiments of the present invention, which are shown in accompanying drawings.

DETAILED DESCRIPTION OF PREFERRED EMBODIMENT

Figure 1A:
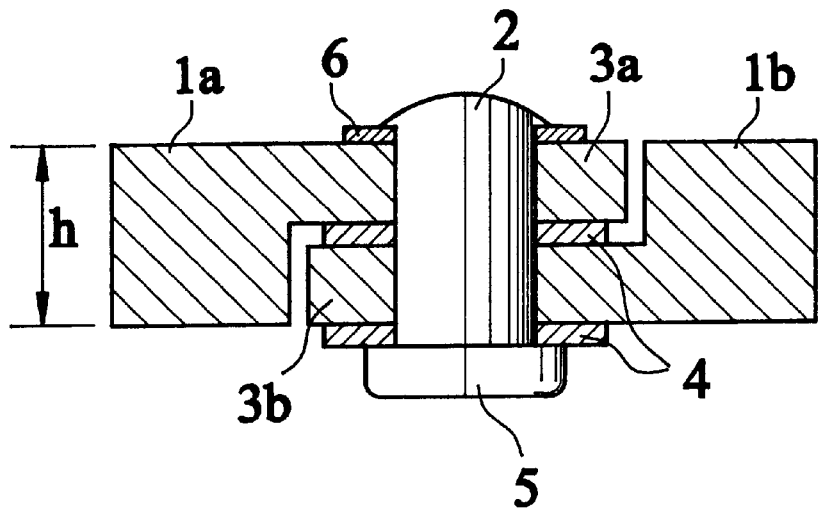
FIGS. 1a and 1b are a cross-section and front view of a hinge structure according to a first embodiment of the present invention respectively.
Figure 1B:
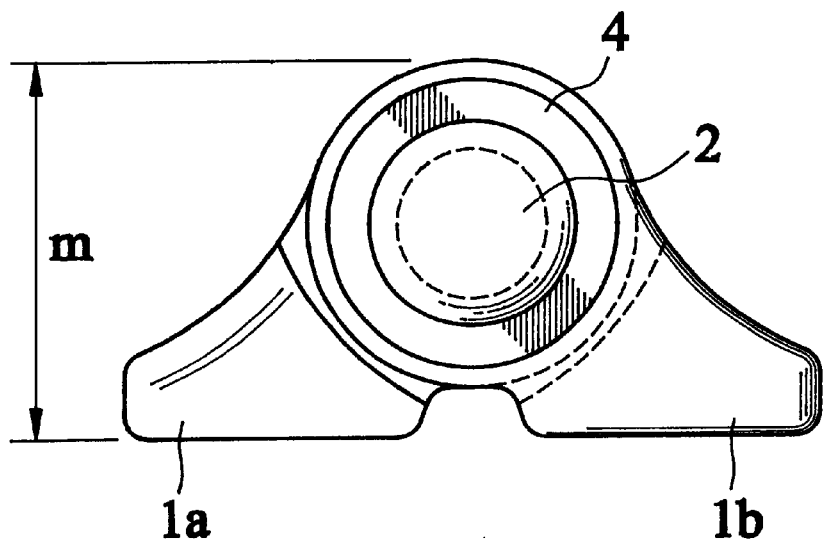

Referring to FIGS. 1a and 1b, a hinge structure according to the first embodiment comprises first and second semicolon-like rotary pieces 1a and 1b rotatably jointed by a headed pivot pin 2. Each semicolon-like rotary piece 1a or 1b has a step-like circular extension 3a or 3b integrally connected to its triangular block. The step-like circular extension has a through hole made therein, and the first and second semicolon-like rotary pieces 1a and 1b are so combined that the step-like extensions 3a and 3b may be laid on each other with their through holes aligned, and then the first and second semicolon-like rotary pieces 1a and 1b are rotatably jointed by inserting the headed pivot pin 2 in their through holes and by swaging the end of the headed pivot pin against the first rotary piece 1a.

As seen from the drawings, a flat washer 4 is sandwiched between the confronting surfaces of the step like-circular extensions 3a and 3b; another flat washer 4 is sandwiched between the head 5 of the headed pivot pin 2 and the second rotary piece 1b; and an outward-curved resilient washer 6 is laid between the first rotary piece 1a; and the swaged end of the headed pivot pin 2. These flat washers 4 prevent the wear of the confronting surfaces of the step like-circular extensions 3a and 3b, and the wear of the confronting surfaces of the step like-circular extension 3b and the lower surface of the head 5 of the headed pivot pin 2. The rotary piece 1a is fixed to the headed pivot pin 2 by swaging the end of the headed pivot pin 2 against the step-like extension 3a of the first rotary piece 1a, thus allowing the step-like extension 3b of the second rotary piece 1b to rotate around the headed pivot pin 2. The flat washers 4, therefore, are used to prevent the wear of the opposite surfaces of the step-like extension 3b and the confronting surfaces of the step-like extension 3a and the head 5 of the headed pivot pin 2.

Such flat washers may be of metal, nylon or duracon. When the end of the headed pivot pin 2 is swaged against the first rotary piece 1a, the swaged end cannot apply a controlled force to the combination of rotary pieces thus joined. The outward-curved resilient washer 6 is yieldingly flattened so as to apply a resilient force to the combination of rotary pieces, thereby compensating for the irregularity in the pressing force applied to the combination of rotary pieces. Thus, the temple, which is soldered to the second rotary piece 1b, can be smoothly folded on and apart from the front of the eyeglasses.

Figure 2A:
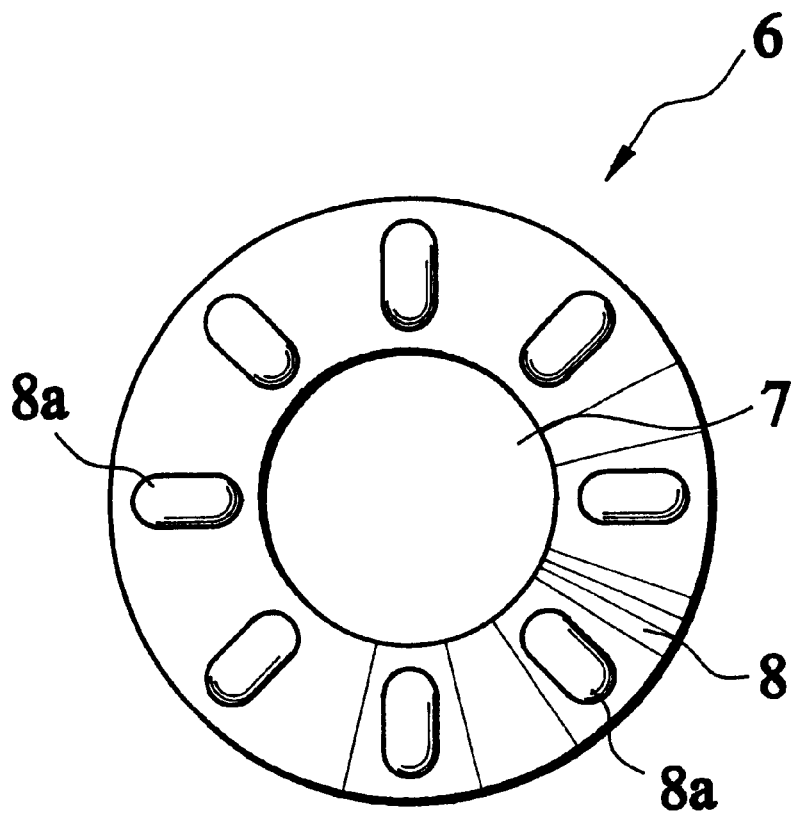
FIGS. 2a and 2b are a plane view and cross-section of an outward curved washer respectively.
Figure 2B:
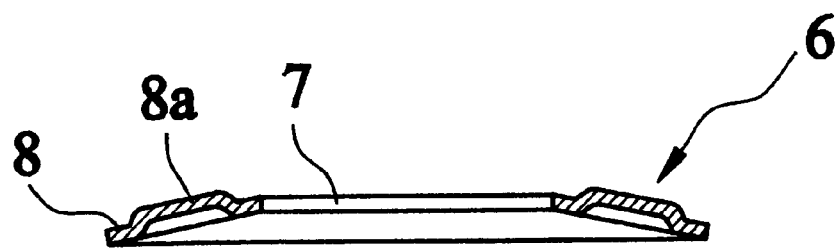

As seen from FIGS. 2a and 2b, the outward-curved resilient washer 6 has a hole 7 made at its center and a number of radial bulges 8a formed on its annular surface 8, thereby compensating for the losing strength caused by the hole 7 made at the center of the disk. The outward-curved resilient washer 6 can be flattened 0.05 to 0.07 millimeters high.

In assembling different parts into a hinge structure, first, the shank of the headed pivot pin 2 is inserted in the hole of the first flat washer 4, the through hole of the step-like circular extension 3b of the second semicolon rotary piece 1b, the hole of the second washer 4, the through hole of the step-like circular extension 3a of the first semicolon rotary piece 1a, and finally the hole of the outward-curved resilient washer 6 in the order named, and finally the shank end of the headed pivot pin 2 is swaged against the first rotary piece 1a. No collared washers are used.

Figure 5A:
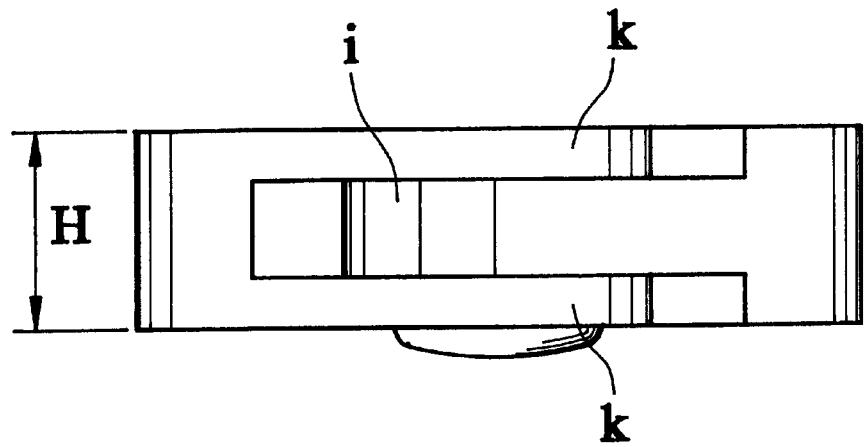
FIGS. 5a and 5b are a plane view and front view of a conventional hinge structure respectively.
Figure 5B:
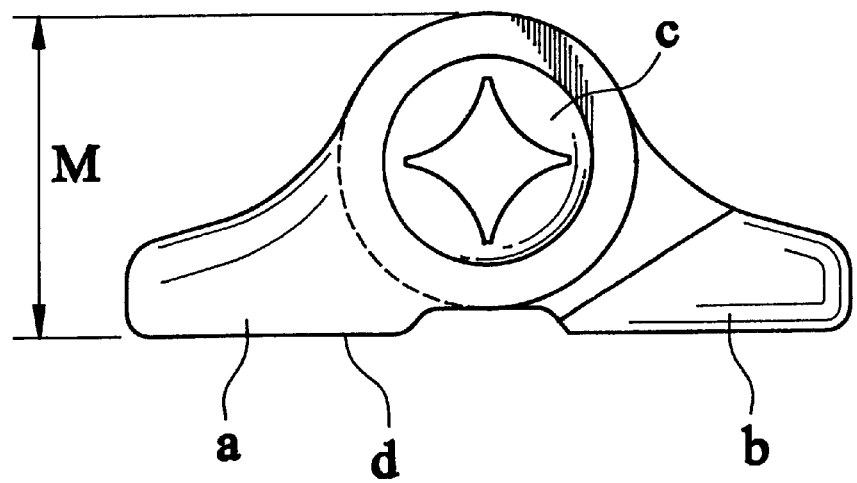
Figure 6:
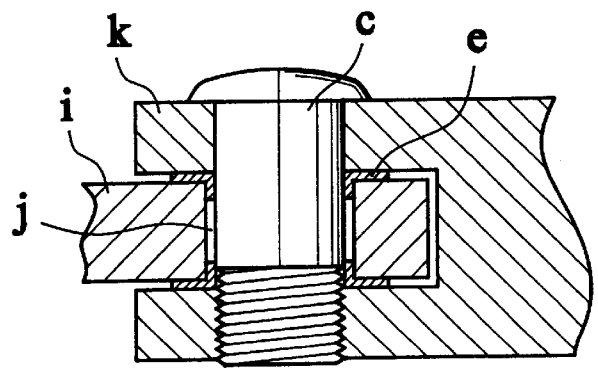
FIG. 6 is a cross section of the joint of another conventional hinge structure using collared washers.
Figure 7A:
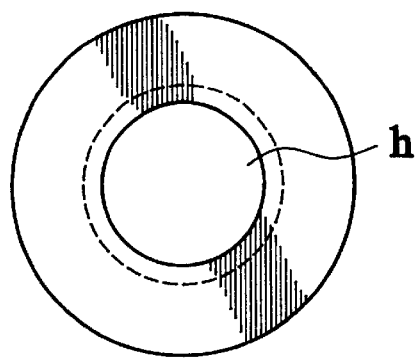
FIGS. 7a and 7b are a plane view and front view of a collared washer.
Figure 7B:
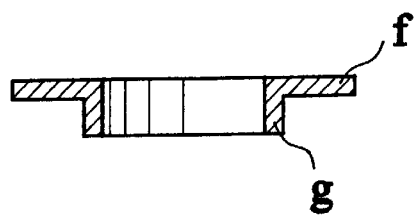

Comparing the sizes of such different parts with those in the conventional hinge structures of FIGS. 5 and 6, the height "h" of the semicolon-like rotary piece 3a or 3b (FIG. 1a) is shorter than the height "H" of the semicolon-like rotary piece (FIG. 5a); and the diameter "m" of the step-like circular extension 3a or 3b (FIG. 1b) is smaller than the diameter "M" of the circular extension "i" or "k" of the conventional structure (see FIG. 5b). Because of use of collar-less or flat washers the through hole of the step-like circular extension 3a or 3b is smaller than that of the circular extension "i" or "k" in FIG. 6, and accordingly the step-like circular extension 3a or 3b is smaller than the circular extension "i" or "k" in FIG. 6. Thus, the hinge structure according to the present invention is significantly smaller than the conventional hinge structure in size, still assuring that it has the same strength as the conventional hinge structure.

Figure 3:
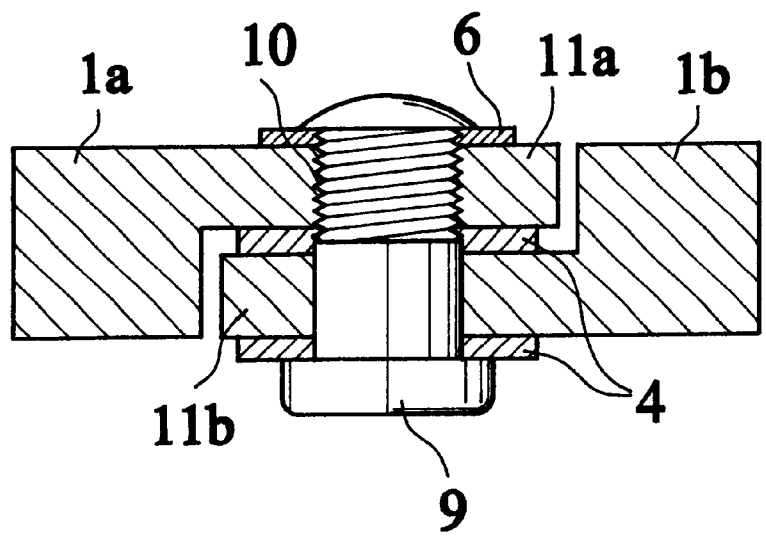
FIG. 3 is a cross-section of a hinge structure according to a second embodiment of the present invention.

Referring to FIG. 3, a hinge structure according to the second embodiment of the present invention uses a headed pin whose shank 9 has male threads 10 formed on its end length. The step-like extension 11a of the first rotary piece 1a has female threads 10 formed in its through hole, thereby permitting the male-threaded end of the pivot pin 9 to be meshed with the female threads 10 of the through hole of the step-like extension 11a of the first semicolon-like rotary piece 1a. The end of the headed pivot pin appearing on the outward curved washer is swaged against on the outward curved washer. The tightening of the headed pivot pin 9 in the first rotary piece 1a is so controlled that the first and second rotary pieces 1a and 1b may be smoothly rotated, providing some pleasing resistance to the folding or unfolding action. The attractive force applied to the confronting step-like circular extensions 11a and 11b can be maintained by the outward curved washer even though the flat washers 4 are worn more or less.

Figure 4:
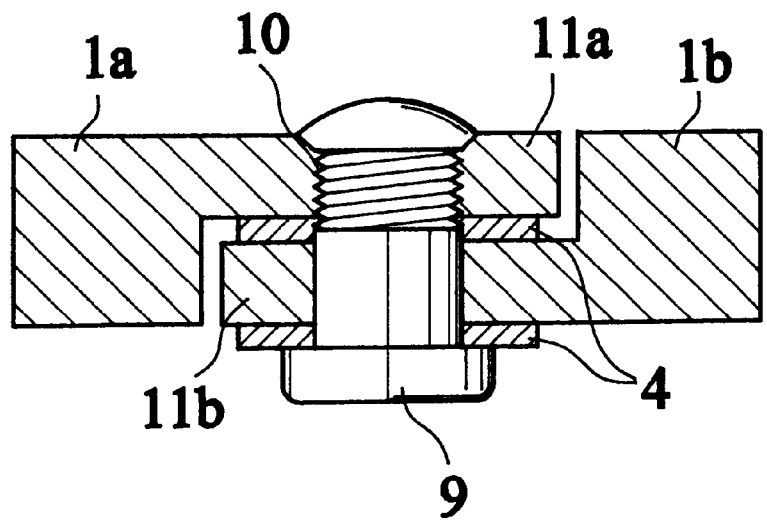
FIG. 4 is a cross-section of a hinge structure according to a third embodiment of the present invention.

Referring to FIG. 4, a hinge structure according to the third embodiment of the present invention uses a headed pin whose shank 9 has male threads 10 formed on its end length. The step-like extension 11a of the first rotary piece 1a has female threads 10 formed in its through hole, thereby permitting the male-threaded end of the pivot pin 9 to be meshed with the female threads 10 of the through hole of the step-like extension 11a of the first semicolon-like rotary piece 1*a*. The end of the headed pivot pin appearing on the first rotary piece 1*a* is swaged against thereon. The tightening of the headed pivot pin in the first rotary piece 1*a* is so controlled that the first and second rotary pieces 1*a* and 1*b* may be smoothly rotated, providing some pleasing resistance to the folding or unfolding action. The hinge structure is essentially similar to the first and second embodiments, but different from the first embodiment only in that the headed pivot pin is threadedly engaged in the through hole of the step-like circular extension of the first rotary piece, and different from the second embodiment only in that it has no outward curved washer.

As may be understood from the above, a hinge structure according to the present invention is small enough to be fitted to the wire frame of eyeglasses, not spoiling the attractive sliminess at all.

Different parts can be easily assembled into a hinge structure, requiring neither skill nor tediousness in assembling.

Outward curved washers used effectively compensate for the irregularity in compressing effect caused by swaging, thus assuring that all hinge structures function well in controlled fashion.

What is claimed is:

1. A hinge structure for joining a temple and a front or lens rim together in eyeglasses comprising: two semicolon-like rotary pieces each having a step-like circular extension integrally connected to its triangular block, the step-like circular extension having a through hole made therein; a pivot pin; two flat washers and an outward-curved resilient washer, the semicolon-like rotary pieces being so combined that their step-like circular extensions are laid on each other, with one of the flat washers sandwiched therebetween, and the semicolon-like rotary pieces being joined together by inserting the pivot pin in the through holes of the step-like extensions with the other flat washer laid on one side of the so combined rotary pieces, and with the outward-curved resilient washer laid on the other side of the so combined rotary pieces, the pivot pin being swaged against the so combined rotary pieces, the triangular blocks of the rotary pieces being to be fixed to the temple and the front or lens rim of the frame.

2. A hinge structure according to claim 1, wherein the pivot pin is a headed pin whose shank has male threads formed on its end length, and the step-like extension of one of the two rotary pieces has female threads formed in its through hole, thereby permitting the male-threaded end of the pivot pin to be meshed with the female threads of the through hole of the step-like extension.

3. A hinge structure according to claim 2, wherein the outward-curved resilient washer has semi a number of radial bulges formed on its annular surface.

4. A hinge structure for joining a temple and a front or lens rim together in eyeglasses comprising: two semicolon-like rotary pieces each having a step-like circular extension integrally connected to its triangular block, each step-like circular extension having a through hole made therein, the through hole of the step-like extension of one of the semicolon-like rotary pieces having female threads formed therein; a headed pivot pin whose shank has male threads formed on its end length; and two flat washers, the semicolon-like rotary pieces being so combined that their step-like circular extensions are laid on each other with one of the flat washers sandwiched therebetween, and with the other flat washer sandwiched between the head of the headed pivot pin and the counter surface of the step-like extension of the other semicolon-like rotary piece, the semicolon-like rotary pieces being joined together by inserting the pivot pin in the through holes of the step-like extensions and by swaging the end of the headed pivot pin against the counter surface of the step-like extension of the one semicolon-like rotary piece, the triangular blocks of the rotary pieces being to be fixed to the temple and the front or lens rim of the frame.

* * * * *